(12) United States Patent
Poyet (10) Patent No.: US 10,029,928 B2
(45) Date of Patent: Jul. 24, 2018

(54) DEVICE FOR MANUFACTURING SODIUM HYPOCHLORITE OR HYPOCHLOROUS ACID AND WATER TREATMENT SYSTEM IN GENERAL

(75) Inventor: Michel Poyet, Aix en Provence (FR)

(73) Assignee: MP Technic, Aix en Provence (FR)

( * ) Notice: Subject to any disclaimer, the term of this patent is extended or adjusted under 35 U.S.C. 154(b) by 1016 days.

(21) Appl. No.: 14/125,879

(22) PCT Filed: Jun. 18, 2012

(86) PCT No.: PCT/EP2012/061620
§ 371 (c)(1),
(2), (4) Date: Mar. 18, 2014

(87) PCT Pub. No.: WO2012/172118
PCT Pub. Date: Dec. 20, 2012

(65) Prior Publication Data
US 2014/0217035 A1    Aug. 7, 2014

(30) Foreign Application Priority Data

Jun. 16, 2011    (FR) ...................................... 11 01845

(51) Int. Cl.
*C02F 1/46*       (2006.01)
*C02F 1/461*      (2006.01)
(Continued)

(52) U.S. Cl.
CPC .......... *C02F 1/46104* (2013.01); *C02F 1/008* (2013.01); *C02F 1/4674* (2013.01);
(Continued)

(58) Field of Classification Search
CPC .... C02F 1/46104; C02F 1/008; C02F 1/4674; C02F 2209/008; C02F 2209/04;
(Continued)

(56) References Cited

U.S. PATENT DOCUMENTS 3,785,951 A    1/1974    Fleck
4,260,468 A    4/1981    Bradley
(Continued)

FOREIGN PATENT DOCUMENTS

DE    102009033153 A1    12/2010
EP         0909739 A2     4/1999
(Continued)

OTHER PUBLICATIONS

English Translation of the International Preliminary Report on Patentability, IB, Geneva, dated Dec. 17, 2013 (7 pages), incorporating the English Translation of the Written Opinion of the ISA, ISA/EP, Rijswijk, NL, dated Oct. 5, 2012 (6 pages).

*Primary Examiner* — Walter Dean Griffin
*Assistant Examiner* — Cameron J Allen
(74) *Attorney, Agent, or Firm* — Harness, Dickey & Pierce, PLC (57) ABSTRACT

This disclosure includes a device for producing sodium hypochlorite or hypochlorous acid for water treatment, the device including: a cylinder for storing salt in solid form, adapted for being fed directly via a pressurized water pipe, and including one or more tubes that form one or more electrolytic chambers; one or more electrolytic cells received in the electrolytic chambers; the tubes of the cylinders being perforated to allow the contacting of the electrolytic cells with the salt-saturated water while preventing the electrolytic cells from being short-circuited by the solid salt. This produces sodium hypochlorite or hypochlorous acid from salt-saturated water in a cylinder, connected directly to the pipe of the water to be treated without the latter being loaded with salt.

15 Claims, 4 Drawing Sheets

(51) Int. Cl.
  *C02F 1/467* (2006.01)
  *C25B 1/26* (2006.01)
  *C25B 9/00* (2006.01)
  *C25B 9/18* (2006.01)
  *C25B 15/02* (2006.01)
  *C02F 1/00* (2006.01)

(52) U.S. Cl.
  CPC ............... *C25B 1/26* (2013.01); *C25B 9/00* (2013.01); *C25B 9/18* (2013.01); *C25B 15/02* (2013.01); *C02F 1/46109* (2013.01); *C02F 2001/46142* (2013.01); *C02F 2201/4618* (2013.01); *C02F 2209/008* (2013.01); *C02F 2209/04* (2013.01); *C02F 2209/06* (2013.01)

(58) Field of Classification Search
  CPC ........ C02F 2209/06; C02F 2001/46142; C02F 2201/4618; C02F 1/46109; C02F 1/00; C02F 1/467; C25B 1/26; C25B 9/00; C25B 9/08; C25B 15/02; C25B 9/18
  See application file for complete search history.

(56) References Cited

U.S. PATENT DOCUMENTS

| | | | |
|---|---|---|---|
| 4,357,224 A | 11/1982 | Hardman et al. | |
| 4,439,295 A | 3/1984 | Richards | |
| 4,596,648 A | 6/1986 | Sweeney | |
| 5,037,519 A * | 8/1991 | Wiscombe | C02F 1/4674 204/237 |
| 5,094,734 A * | 3/1992 | Torrado | C02F 1/4672 204/234 |
| 5,364,512 A * | 11/1994 | Earl | C02F 1/4606 204/229.6 |
| 5,693,213 A | 12/1997 | Shimamune et al. | |
| 5,807,473 A * | 9/1998 | Sadler | C02F 1/46104 204/278.5 |
| 5,968,454 A | 10/1999 | Deacon et al. | |
| 6,274,009 B1 | 8/2001 | Krafton et al. | |
| 6,881,320 B1 | 4/2005 | Krafton et al. | |
| 7,014,753 B2 | 3/2006 | Holstein et al. | |
| 7,658,824 B2 | 2/2010 | Bremauer | |
| 7,695,606 B2 | 4/2010 | Tholen | |
| 7,799,198 B2 | 9/2010 | Nanjundiah et al. | |
| 7,879,208 B2 | 2/2011 | Wu et al. | |
| 7,914,659 B2 | 3/2011 | Nanjundiah et al. | |
| 7,972,519 B2 | 7/2011 | Koos et al. | |
| 8,512,529 B2 | 8/2013 | Wu et al. | |
| 2002/0014460 A1 * | 2/2002 | McKay | C02F 1/4606 210/696 |
| 2005/0137118 A1 * | 6/2005 | Silveri | C02F 1/008 510/514 |
| 2006/0120928 A1 | 6/2006 | Annacone | |
| 2007/0251887 A1 | 11/2007 | Koos et al. | |
| 2009/0008243 A1 | 1/2009 | Lin et al. | |
| 2009/0188788 A1 | 7/2009 | Habif et al. | |
| 2010/0252445 A1 | 10/2010 | Highgate et al. | |
| 2011/0129388 A1 | 6/2011 | Alarid et al. | |
| 2013/0008196 A1 | 1/2013 | Poyet | |

FOREIGN PATENT DOCUMENTS

| | | | |
|---|---|---|---|
| EP | 1728768 A1 | 12/2006 | |
| FR | 2576325 A1 | 7/1986 | |
| FR | 2872048 A1 | 12/2005 | |
| WO | WO 2006004539 A1 * | 1/2006 | ............ B01D 35/06 |

* cited by examiner

DEVICE FOR MANUFACTURING SODIUM HYPOCHLORITE OR HYPOCHLOROUS ACID AND WATER TREATMENT SYSTEM IN GENERAL

CROSS-REFERENCE TO RELATED APPLICATIONS

This application is a National Phase Entry of International Application No. PCT/EP2012/061620, filed on Jun. 18, 2012, which claims priority to French Patent Application Serial No. 1101845, filed on Jun. 16, 2011, both of which are incorporated by reference herein.

BACKGROUND AND SUMMARY

For treating water circulating in the water systems of buildings, houses, communities, industry in general, retention basins and swimming pools to make it potable, additions of different chemicals are commonly used, by means of mechanical metering pumps. These systems are exacting and require almost daily supervision. Maintenance is difficult and requires qualified personnel. In addition, they necessitate the manufacture, transport and storage of hazardous chemicals. Over the years, different techniques have appeared on the market for the treatment of potable water. We can classify them into several categories.

The first category, which seems to be the largest, comprises systems using an ion exchange membrane that divides a tank into two compartments. The first compartment is to receive a graphite electrode (the anode), which will be immersed in a solution saturated with salt (hereinafter NaCl). The second compartment receives the second electrode (the cathode), generally made of titanium. It only serves for electrical exchange between the two electrodes. It is not immersed in the brine, but in water. A low voltage current is sent to the electrodes to carry out electrolysis. During this electrolysis the NaCl will be decomposed into two parts (HOCl and OCl$^-$) to form hypochlorous acid (HOCl) in gaseous form. This gas is then aspirated by the venturi effect and is mixed with the water to be treated.

This operating principle is very restricting for several reasons:

Firstly: for evacuating the gas formed during electrolysis, it is necessary to provide a venturi system on the pipework. This system reduces the pipeline diameter, and therefore its flow rate, considerably.

Secondly: on a basin or on a swimming pool, when a flange is mounted on a pipe, the water flow rate is no longer maintained and consequently the water to be filtered is no longer filtered correctly. In fact, the pump delivery and the filter diameter were selected during the design of the installation, for a precise volume and flow rate of water. If these parameters are altered, filtration efficiency is reduced.

Thirdly: the gas manufactured in this form is dangerous and must be injected into the water immediately. If the flow of water is reduced or is almost zero and if electrolysis continues to take place, but the system has no safety device, the gas manufactured can be dispersed into the air, with appreciable risks of toxicity for the user.

Fourthly: the membrane separating the anode from the cathode in the tank is very fragile. It will not withstand hard water. That is why certain manufacturers recommend the use of a water softener upstream, set at 0 degree TH. Others have incorporated a softener in their systems directly. This apparatus limits the flow rates of water to be treated. Others recommend a cartridge filled with anionic resins, which will capture the calcium ions. The flow rate of water to be treated is reduced even more.

Fifthly: most of these systems use graphite electrodes for the anode. Graphite has a very short working life (6 months on average). As a result the system is restrictive in its use. Under these conditions it is no longer automatic.

The second category relates to electrochlorination systems, which produce hypochlorous acid starting from a precise concentration of NaCl diluted in the water of a basin or of a swimming pool. These systems are limited to basins, water reserves or swimming pools using recirculating pumps and cannot treat water directly.

The operating principle is as follows:

Salt is poured directly into the water to be treated and the concentration of NaCl varies from 2 to 7 g per liter of water to be treated, depending on the surface area of the plates that constitute the electrodes and the current sent to the latter. The salt-laden water passes over these electrodes of a known type, under conditions such that the sodium chloride is decomposed by known electrochemical reactions, in order to obtain the quantity of sodium hypochlorite necessary for maintaining a level of active chlorine that disinfects the water. Thus, the disinfectant is created continuously during the filtration cycles. It acts on the bacteria and other microorganisms, destroying them and making the water safe.

On the other hand, these systems cannot be used for treating water for consumption, as its NaCl content is too high. Nor can they be used for treating water in various circuits (such as cold water systems and hot water systems in buildings, in an industrial environment such as cooling towers or communities, or in heating circuits). The high NaCl concentration would quickly corrode the pipes or the metallic components of these installations.

This operating principle is restricting for several reasons:

Firstly: The charge in the basin is large (about 500 kg for a 100 m$^3$ basin). This charge is expensive, and professionals who use this technique must store pallets of NaCl in large quantity.

Secondly: NaCl is a very corrosive product and NaCl-laden water will gradually damage elements that are immersed in the water. For basins lined with concrete, the lining will gradually be destroyed. In a swimming pool, it is the edges that will be destroyed. Metallic parts such as ladders will also deteriorate very rapidly. For a protective cover, for example for a swimming pool, its components, such as the shafts of the motors or the plates, will also deteriorate.

The third category relates to systems that use two separate tanks. The first tank is filled with NaCl-saturated water, in which electrolysis is carried out, to produce hypochlorous acid. This hypochlorous acid is then pumped and injected into a second closed, sealed tank, which serves for storage. Then a second pump will aspirate this product, which is a powerful disinfectant, and inject it into the water circuit to be treated.

This operating principle is not easy to use as it is very technical. It requires considerable supervision by a well-trained person. It is not to be entrusted to just anyone. The installation is a source of technical problems, especially the metering pumps.

The fourth category relates to systems that carry out electrolysis of NaCl-saturated water directly in a tank connected to the pipeline of the water to be treated, either by aspirating the water laden with hypochlorous acid by the venturi effect, or by natural degassing of the hypochlorous acid directly in the water to be treated.

These systems have several problems:

Firstly: for systems that degas directly in the water to be treated, the method used for carrying out electrolysis is not sufficiently reliable. In fact, they use electrodes that are not bipolar, as they are constituted by graphite. Graphite has a low efficiency for the manufacture of sodium hypochlorite. The average output of systems of this type is of the order of 7 g/hour, which is not very economical and useful.

Secondly: During use, the calcium present in the water solidifies on one of the electrodes and electrical exchange no longer takes place.

Thirdly: in this configuration, the electrodes, which are not separated by a membrane, are in direct contact with the solid salt pellets in the storage tank. Moreover, some of these pellets will not dissolve, as the water is saturated with NaCl. During electrolysis, the pellets of solid salt will promote short circuits between the two electrodes. As a result, the electrodes are quickly destroyed.

Fourthly: the tank into which the electrodes are inserted is not very practical. The electrodes are long and are inserted at the top. When it becomes necessary to replace them, if the room in which the apparatus is installed is not of sufficient height, replacement will be impossible in this case.

Fifthly: they are not equipped with safety devices for stopping the manufacture of hypochlorous acid, and in the case of a malfunction the gas may be compressed, and may thus cause an explosion.

In conclusion, systems of this type can be dangerous for the user and their efficiency in the production of hypochlorous acid is too low.

References of existing patents relating to the invention: EP0686709; EP0909739; WO2009007691; WO0118279; WO09300460; EP1728768; FR2888837; WO2006055361; WO03055806; EP0063420; WO9951332; WO2010/0111989; WO2006/015071; WO2007092172; U.S. Pat. No. 4,596,648; FR2576325; WO2004108613; WO2005009906; WO2007092754.

The invention proposes a device for the production of sodium hypochlorite or of hypochlorous acid for water treatment, the device being suitable for being connected directly to a pipeline of water to be treated under pressure, the device comprising:

a cylinder for storing salt in solid form, the cylinder being suitable for being supplied directly by the pipeline of water to be treated under pressure, the cylinder comprising one or more tubes forming one or more electrolysis chambers;

one or more electrolytic cells received in one or more of the electrolysis chambers, the one or more electrolytic cells comprising electrodes;

one or more tubes of the cylinder being perforated to allow one or more of the electrolytic cells to come into contact with the salt-saturated water, avoiding the electrodes of the one or more electrolytic cells being short-circuited by the solid salt originating from the cylinder.

According to an embodiment, the salt is not in the water to be treated. According to an embodiment, one or more electrolytic cells are inserted into one or more electrolysis chambers, being received by screwing in the one or more electrolysis chambers.

According to an embodiment, the device comprises:

on the cylinder, a part that is flat over almost its full height to allow connecting and sealing of the electrolysis chamber or chambers receiving the electrolytic cell or cells;

a pipe union that allows the upper part to be dismantled and to be detached from the pipeline of water to be treated under pressure.

According to an embodiment, the device comprises:

three parts over the height, namely a bottom part that serves as general support, a central part comprising storage of the salt and provided for carrying out electrolysis there for producing sodium hypochlorite or hypochiorous acid starting from the salt-saturated water and a top part comprising the closure of the cylinder and connection to the pipeline of water to be treated, allowing the upper part to be dismantled and to be detached from the pipeline of water to be treated.

According to an embodiment, the device comprises:

an electrovalve intended to be opened regularly to allow the gases produced to escape and to close when the device stops, so that the water contained in the cylinder is almost never in direct contact with the water that circulates in the pipeline of water to be treated under pressure.

According to an embodiment, one or more tubes of the cylinder are perforated to allow the one or more electrolytic cells to come into contact with the salt-saturated water, avoiding bringing the one or more electrolytic cells into direct contact with the solid salt stored in the cylinder. According to an embodiment, one or more electrolytic cells have polarity alternation. According to an embodiment, one or more electrolytic cells are composed of one or more plates preferably with 2 to 20 units made of titanium covered with metal oxides.

The invention further proposes a water treatment system comprising:

the aforesaid device for manufacturing sodium hypochlorite or hypochlorous acid;

a pipeline of water to be treated under pressure;

a union of the pipeline and of the cylinder of the device;

a control unit controlling the manufacture of sodium hypochlorite or of hypochlorous acid.

According to an embodiment, the system comprises a flow detector that is positioned on the pipeline, upstream of the union, for detecting whether or not there is flow of water in the pipeline, for the device to be started, or not, by the control unit.

According to an embodiment, the system comprises in the pipeline:

after the flow detector and upstream of the union and of the device, a redox or amperometric electrode to analyse the oxidizing power of the water for regulating the oxidizing power of the water by allowing or not allowing the production of sodium hypochlorite or of hypochlorous acid;

after the redox or amperometric electrode, a pH electrode, which makes it possible to analyse and regulate the pH of the water to be treated.

According to an embodiment, the system comprises:

a pressure controller positioned on the cylinder of the device in its top part for detecting an excessive pressure, at which the control unit stops the manufacture of sodium hypochlorite or of hypochlorous acid;

a drain cock at the bottom, to allow maintenance of the device.

According to an embodiment, the pipeline comprises, downstream of the union with the device:

an inverted ball valve, for stopping the circulation of water in the pipeline, aspirating the air and purging the pipeline.

The invention further proposes a unit for remote processing of the data from a device for manufacturing sodium hypochlorite or hypochlorous acid, said unit comprising:

the system as above; and a system for remote data transmission to a centralized data storage on a server or to a remote troubleshooter comprising a remote communication device selected from the group comprising a carrier current connector transmitter/receiver, GPRS transmitter/receiver, WIFI transmitter/receiver.

The invention further proposes a unit for remote processing of the data from a device for manufacturing sodium hypochlorite or hypochlorous acid, said unit comprising:

the system as above whose control unit comprises a unit for collecting data on the state of operation and malfunction of the device;

a system for remote data transmission, the system being external to the control unit and designed for communicating by carrier current with the data collecting unit, the system for remote transmission of data comprising a modem for remote sending of the data collected by the collecting unit and received by the control unit;

software for processing the data transmitted by the system for remote data transmission by means of the modem.

The invention also proposes a method of water treatment comprising:

supplying a device as above for the production of sodium hypochlorite or hypochlorous acid;

connecting the device to a pipeline of water to be treated under pressure so as to form the water treatment system as above;

producing sodium hypochlorite or hypochiorous acid by means of the water treatment system;

disinfecting the water to be treated by means of the production of sodium hypochlorite or of hypochlorous acid. According to an embodiment, the pipeline of water to be treated under pressure is a delivery pipe of a swimming pool installation.

The invention finally proposes a method for remote processing of the data from a device for manufacturing sodium hypochlorite or hypochiorous acid, using the aforesaid processing unit, said method comprising:

collecting data on the state of operation and of malfunction of the device by the unit for collecting data from the device;

communicating the data collected by the data collecting unit via carrier current, to the system for remote data transmission;

transmitting the data remotely by the system for remote data transmission, via its modem, the data being processed by the processing software.

According to an embodiment, the method further comprises, after processing of the data transmitted remotely:

adaptation of the control of the device by the sending of instructions for adaptation of the control of the device to the system for remote data transmission.

The device according to the invention makes it possible to rectify the drawbacks and defects of the different patents defined above in references. In particular, it improves the conventional methods, in the sense that it greatly reduces the salt charges to be put in the water for basins, reserves or swimming pools. In fact, for systems that use salt-laden water, when filter washing is carried out, the water from these washings is discharged in the natural environment and this water overloaded with salt will have an adverse effect on the environment. The invention also rectifies this problem by removing salt from the water of these installations. Moreover, for treating potable water of communities, buildings, industries, for the treatment of cooling towers and of water systems in general, it eliminates the metering pumps that are often the source of breakdown. It also makes it possible to avoid the transport and storage of dangerous chemicals such as chlorine and chlorine derivatives, especially if they are liquid.

Disinfection is an important step in water treatment. It has a hygienic purpose, preventing the transmission of the numerous diseases that are possible if water is poorly treated. It is estimated that a child dies every minute, somewhere in the world, through ingesting water of poor quality. The invention is easily installed and can quickly control this problem at lower cost, anywhere in the world. The device is proposed for water treatment, such as the treatment of potable water of communities, buildings, industry in general, in the chemical industry, the paint and lime industries, the food industry, the glass industry, the paper industry, the pharmaceutical industry, the textile industry, the synthesis industry, the waste disposal industry, treatment of cooling towers, agriculture, basins, water reserves, swimming pools and water systems in general.

According to an aspect of the invention, the following is proposed in particular: A device for manufacturing sodium hypochlorite or hypochlorous acid (which is a powerful disinfectant), installed directly on pipework for circulation of water, for the purpose of treating it. Said system is composed of one or more electrolysis chambers, in which one or more bipolar electrolytic cells will be inserted. These bipolar electrolytic cells are composed of several plates, of sufficient thickness to be rigid, and in a specific metal such as titanium, covered with metal oxides, such as ruthenium and iridium in several successive layers. The electrolysis chambers that will receive these bipolar electrolytic cells consist of a tube perforated with holes with a diameter smaller than a conventional salt pellet, in order to prevent them from being in direct contact with the solid NaCl, but only in contact with the NaCl-saturated water. The electrolysis chambers comprising the bipolar electrolytic cells are inserted into a cylinder under pressure, in which the salt is stored. The whole operation is controlled by a specific control box. This box allows analysis of the concentration of oxidant in the water as well as the pH of the water. It comprises a device for transmitting the data remotely to a centralized data storage on a server or to a remote troubleshooter. The remote communication device comprises a remote communication unit formed from the group comprising a carrier current connector transmitter/receiver, GPRS transmitter/receiver, WIFI transmitter/receiver.

According to an aspect of the invention, a device is proposed for manufacturing sodium hypochlorite or hypochlorous acid that comprises:

a cylinder that will allow the storage of salt and insertion of one or more electrolysis chambers, into which one or more bipolar electrolytic cells will be screwed. This cylinder is installed on the main water inlet for the treatment the potable water for communities, buildings, industry in general, the chemical industry, the paint and lime industries, the food industry, the glass industry, the paper industry, the pharmaceutical industry, the textile industry, the synthesis industry, the waste disposal industry, treatment of cooling towers, agriculture, basins, water reserves, swimming pools and water systems in general.

it is preferably installed on the delivery line when it is a swimming pool, a basin or a reserve.

According to a variant, the device for manufacturing sodium hypochlorite or hypochlorous acid comprises:

on the cylinder, a part that is flat over almost its full height, which will allow the connecting and sealing of one or more electrolysis chambers that will receive one or more electrolytic cells.

a union having the diameter of the pipeline to be treated.

a pipe union that allows the upper part to be dismantled and to be detached from the pipeline of the water to be treated.

According to a variant, the device for manufacturing sodium hypochlorite or hypochlorous acid comprises, upstream of the union of the pipework and of said cylinder:

a flow detector that is positioned upstream on the main pipeline, making it possible to detect whether or not there is a flow of water. The device for manufacturing sodium hypochlorite or hypochlorous acid is or is not stopped, depending on the information.

According to a variant, the device for manufacturing sodium hypochlorite or hypochlorous acid comprises:

after the flow detector and upstream of the union of the pipework and of the device, a redox or amperometric electrode, which makes it possible to analyse the oxidizing power of the water. The device for manufacturing sodium hypochlorite or hypochlorous acid is or is not stopped, depending on the result.

a pH electrode, which makes it possible to analyse and regulate the pH of the water to be treated.

According to a variant, the device for manufacturing sodium hypochlorite or hypochlorous acid comprises:

an electrovalve operated by a control unit, which opens regularly to allow the gases produced to escape or which opens when an excessive pressure is detected in the cylinder. In this way the water contained in the main cylinder is almost never in direct contact with the water to be treated that is circulating in the pipework. Moreover, the brine contained in the tank has a prolonged working life.

According to a variant, the device for manufacturing sodium hypochlorite or hypochlorous acid comprises, in the top part of said cylinder:

a pressure controller for detecting an excessive gas pressure. Depending on the information, a control unit controls the device for manufacturing sodium hypochlorite or hypochlorous acid, stopping it or not stopping it.

According to a variant, the device for manufacturing sodium hypochlorite or hypochlorous acid comprises, over the height of said cylinder:

one or more openings for inserting one or more electrolysis chambers, into which one or more bipolar electrolytic cells will be screwed.

these bipolar electrolytic cells are composed of several plates, in the invention preferably from 2 to 20 units.

According to a variant, the device for manufacturing sodium hypochlorite or hypochlorous acid comprising these electrolysis chambers are constituted by:

a pipe of sufficient diameter to allow the bipolar electrolytic cells to be inserted. This pipe is closed at the bottom in order to prevent NaCl in solid form entering the inside of this pipe. It is open at the top so that the bipolar electrolytic cells can be screwed in. Over its entire length it is perforated with holes with a diameter smaller than the NaCl pellet, in order to avoid any direct contact between the bipolar electrolytic cells and the NaCl in solid form, while being in contact with the brine.

According to a variant, the device for manufacturing sodium hypochlorite or hypochlorous acid comprises, in the lower part of said cylinder:

a drain cock to allow maintenance of the device.

According to a variant, the device for manufacturing sodium hypochlorite or hypochlorous acid comprises a system for remote data transmission to a centralized data storage on a server or to a remote troubleshooter, the remote communication system comprising:

a remote communication device selected from the group comprising a carrier current connector transmitter/receiver, GPRS transmitter/receiver, WIFI transmitter/receiver.

the invention also proposes a unit for remote processing of the data from a device for manufacturing sodium hypochlorite or hypochlorous acid.

the aforesaid device the control unit of which comprises a unit for collecting data on the state of operation and malfunction of the device.

a system for remote data transmission, the system being external to the device and designed for communicating by carrier current with the data collecting unit, the system comprising a modem for remote sending of the data collected by the collecting unit and received by the system.

software for processing the data transmitted by the transmission system by means of the modem.

According to another aspect of the invention, a method is further proposed for remote processing of the data from a device for manufacturing sodium hypochlorite or hypochlorous acid, using the aforesaid processing unit, said method comprising:

collecting data on the state of operation and of malfunction of the device by the unit for collecting data from the device.

communication, via carrier current, to the system for transmitting the data collected by the data collecting unit;

remote data transmission by the transmission system via its modem, the data being processed by the processing software.

According to an embodiment, the method further comprises, after processing the data transmitted remotely, adaptation of the control of the device by sending instructions for adaptation of control to the system for remote data transmission.

According to another aspect of the invention, a unit is also proposed for remote processing of the data from a device for manufacturing sodium hypochlorite or hypochlorous acid, said unit comprising:

the aforesaid device whose control unit comprises a unit for collecting data on the state of operation and malfunction of the device.

a system for remote data transmission, the system being external to the control unit and designed for communicating by carrier current with the data collecting unit, the system comprising a modem for remote sending of the data collected by the collecting unit and received by the device;

software for processing the data transmitted by the transmission system by means of the modem.

According to another aspect of the invention, a method is further proposed for remote processing of the data from a device for manufacturing sodium hypochlorite or hypochlorous acid, using the aforesaid processing unit, the method comprising:

collecting data on the state of operation and of malfunction of the device by the unit for collecting data from the device.

communication, via carrier current, to the system for transmitting the data collected by the data collecting unit;

remote data transmission by the transmission system via its modem, the data being processed by the processing software.

According to a variant, the method further comprises, after processing the data transmitted remotely, adaptation of the control of the device by the sending of instructions for adaptation of control of the device to the system for remote data transmission.

BRIEF DESCRIPTION OF THE DRAWINGS

Other features and advantages of the invention will become clear on reading the following detailed description of the embodiments of the invention, given solely as an example and with reference to the drawings, which show.

DETAILED DESCRIPTION

A device is proposed for manufacturing sodium hypochlorite or hypochlorous acid, suitable for direct connection on a pipeline of water to be treated under pressure, and a water treatment system in general. The water treatment system comprises the proposed device and the pipeline of water under pressure. The system then also comprises a union from the pipeline under pressure to the device.

The proposed device is suitable for pressures of the water pipeline that can be comprised between 0.5 bar and 16 bar (i.e. between 50,000 Pa and 1 600,000 Pa). In this document, water at said pressures is described as water under pressure, the pressures all being expressed here relative to atmospheric pressure at sea level. The pressure of the water to be treated in the pipeline can in particular depend on the type of installation. For the water of a delivery circuit of a swimming pool, the pressure can be comprised between 2 bar and 4 bar, for the potable water of circuits in buildings, the pressure can range from 2 bar to 7 bar.

Figure 1:
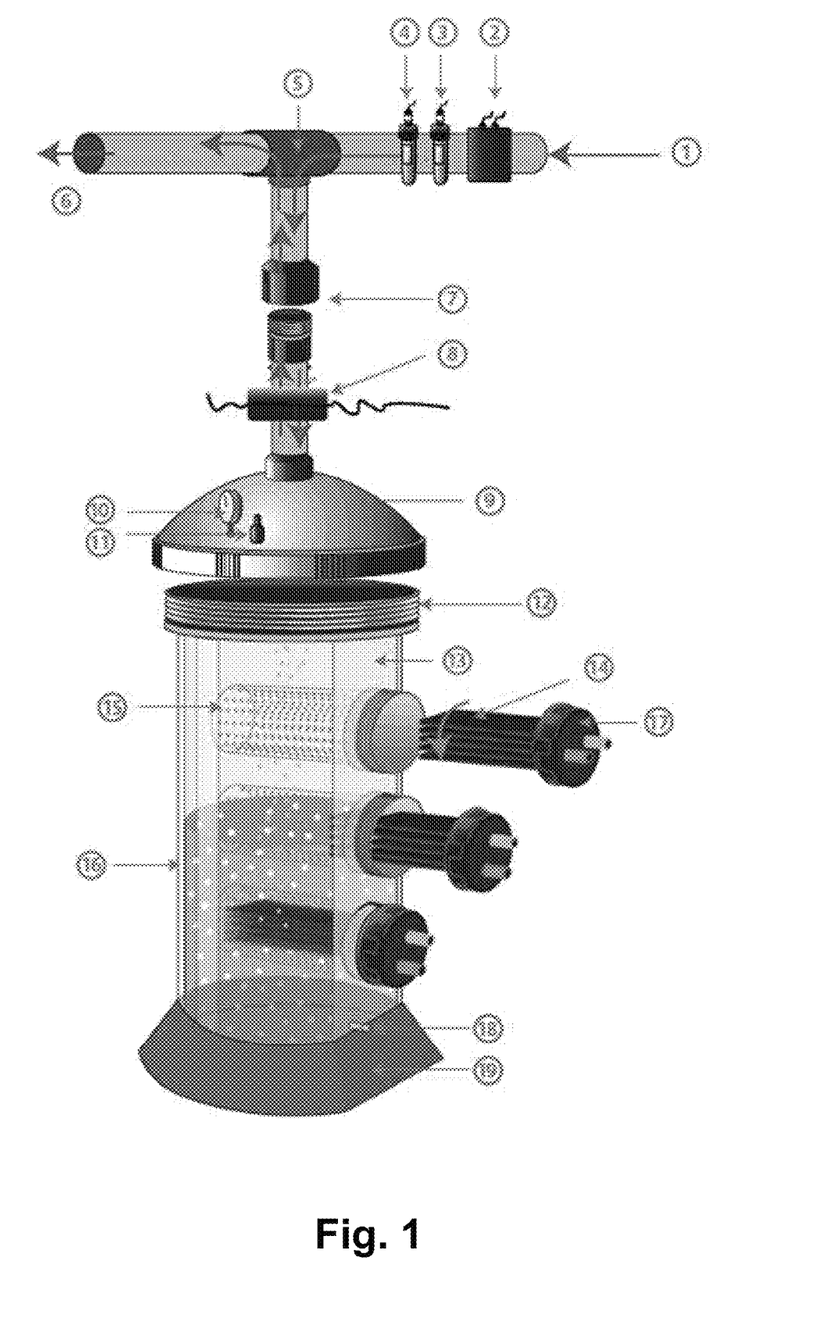
FIG. 1, a schematic diagram of the device for manufacturing sodium hypochlorite or hypochlorous acid 40.

With reference to FIG. 1, the device 40 for manufacturing sodium hypochlorite or hypochlorous acid comprises a cylinder 16. The cylinder 16 can have a circular cross-section with preferred diameter of 250 mm and preferred height of 800 mm. These dimensions are not exhaustive. In general, the cylinder 16 can have any shape generated by a straight line moving parallel to an axis, resting on two fixed planes. Thus, the circular cross-section of the cylinder 16 can be truncated so as to have a flat part 13 over almost its full height, as illustrated.

The device comprises one or more tubes 15, which will be inserted into the cylinder 16. Thus, the cylinder 40 comprises one or more tubes 15. In the remainder of this document, the expression "the tubes" is used instead of the expression "the one or more tubes". According to the embodiment illustrated, the tubes preferably have a diameter of 90 mm and a length of 210 mm and are arranged on the flat portion of the cylinder using a flange. The flat part described above can advantageously facilitate sealed connection of the tubes 15 to the cylinder 40.

The tubes 15 of the cylinder form one or more electrolysis chambers (hereinafter the electrolysis chambers). Thus, the tubes 15 delimit specific volumes of the cylinder in which the reactions of electrolysis of sodium hypochlorite or of hypochlorous acid can be carried out.

For carrying out these reactions, the proposed device further comprises one or more electrolytic cells 42 (hereinafter the electrolytic cells 42) received in the electrolysis chambers. The material of the cylinder and of the tubes can advantageously be transparent, for example made of transparent PVC or of transparent polycarbonate. Thus, the fact that the material is transparent makes it possible to see the interior of the cylinder 16 as well as the interior of the tubes where the chemical reactions will take place.

The cylinder 16 of the proposed device is a cylinder for storing salt, in particular in solid form. The salt corresponds to the reactant of the chemical reactions of electrolysis of sodium hypochlorite or of hypochlorous acid caused by the electrolytic cells. In fact, the reactions take place when the electrolytic cells are under tension and they are immersed in a salt solution.

When the cylinder 16 is open, solid salt can easily be poured into it. The solid salt is preferably in the form of salt pellets, such as salt pellets with a diameter of 2 cm. The cylinder 16 can for example contain a salt charge of about 35 kg. Such a salt charge fills the full height of the cylinder illustrated in FIG. 1. To facilitate access to the inside of the cylinder 16, the proposed cylinder 16 can have a removable top part. Thus, according to the embodiment illustrated, the cylinder is composed of three parts: a main part of the cylinder (denoted by the reference of the cylinder 16), the removable top part 9 and a bottom part 19 or plinth, provided for supporting the whole device 40. The top part 9 comprises an outlet with a diameter of about 50 mm, where a PVC pressure hose of the same diameter will be connected, which receives a pipe union 7 for connection. This union 7 makes it possible to detach the whole device 40 from the general pipework of water to be treated. The top part 9 is fixed on the cylinder 16, preferably via a specific screw thread 12, so that it is removable.

In the proposed device, the tubes form the interface between the part of the cylinder 16 storing the salt, in particular in solid form, and the electrolytic cells received in the chambers formed by the tubes. These tubes are perforated to allow circulation of salt-saturated water originating from the part of the cylinder storing the salt. The holes can represent from 10% to 80% of the interface between the part of the cylinder for storing salt and the chambers. In other words, the wall of the tubes can be constituted by holes over 10% to 80% of its surface area. Preferably, the wall of the tubes can be constituted by holes over 50% to 70% of its surface area.

However, it is advantageous that the salt in solid form does not come directly into contact with the electrodes of the electrolytic cells, to avoid promoting the formation of short-circuits between the electrodes of the cells. More especially, the holes in the tubes forming the chambers have specific shapes to prevent passage, into the electrolysis chambers, of solid agglomerates of salt large enough to lodge in contact between the electrodes of the cells, thus short-circuiting them. The shape and size of holes in the tubes can therefore be selected as a function of the proposed electrolytic cells and in particular as a function of the distance between the electrodes of these cells. For example, the holes can be round holes with a diameter less than the distance between the electrodes of the cells. Thus, after the cylinder has been charged with salt pellets, the salt pellets of a size capable of short-circuiting the electrodes can be blocked by the tubes without passing into the chambers.

Advantageously, the holes in the tubes can have a shape preventing passage of salt pellets into the chambers regardless of the distance between the electrodes of the cells. The holes are then adapted to the size of the salt pellets poured in, such as salt pellets with a diameter of 2 cm, ensuring that the salt pellets poured in do not enter the chambers and do not lodge between the electrodes of the cells. The holes can then be round with a diameter from 2 mm to 2 cm. The perforated tubes can also be made as a grating, the mesh of which is of sufficient size to prevent the salt pellets poured into the cylinder from passing into the electrolysis chambers.

Irrespective of the shape of the holes adopted for the tubes 15, these tubes 15 can be closed at one end to facilitate their manufacture. In the embodiment illustrated, the second of the ends of the tubes corresponds to the glued or welded flange. The flange can comprise a special screw thread 12, onto which one of the electrolytic cells 17 will be screwed.

The operation of the proposed device is now described in more detail, with reference to FIG. 1. When the cylinder 16 contains its salt charge, and the whole device 40 is closed and is connected to the system, water can enter the device 40 by direct connection of the device 40 by means of the union 7. Direct connection of the device to the pipeline of water to be treated signifies that the water entering the cylinder 40 is at the pressure of the water pipeline.

The water circuit is represented by arrows. The air contained in the cylinder 16 will escape via the pipe attached to the general water inlet pipe 1 in the system of water to be treated via the outlet of the pipe 6. Air being lighter than water, this is naturally evacuated following the flow of water through the general pipework and via the outlet 6 which is the direction of flow. Thus, when all of the air has escaped from the cylinder 16, the latter is perfectly filled with water.

When the cylinder 16 is completely filled with water, the cylinder 16 is at the same pressure as the pipeline or pipework for intake of water to be treated. The device 40 is intended to be connected directly on a pipeline of water to be treated under pressure and the cylinder 40 is then suitable for withstanding the pressure of the water pipeline to which the device is connected.

Owing to the direct connection to the pipeline under pressure, when the air is completely evacuated from the cylinder 40, exchanges between the fresh water in the pipework 1 and the brine in the cylinder 16 are greatly limited or even prevented. In particular, as the water in the cylinder 16 and the water in the pipeline are at the same pressure, there is no movement of brine from the cylinder into the water pipeline. As the salt charge in the cylinder 40 is not then diluted in the water pipeline, the salt consumption of the device is limited to the salt used for the reactions of electrolysis. In other words, the salt is not in the water to be treated. This is in particular advantageous in comparison with the devices of the prior art, in the second category described above, where a proportion of the brine serving as reactant for electrolysis is pumped and discharged into the water to be treated. The proposed device can in particular be used for treating water for consumption.

So that the exchanges between the fresh water in the pipework 1 and the brine in the cylinder 16 are limited even more, the hydrostatic pressure can be taken into account, and the connection between the cylinder 40 and the pipeline is made in the top part of the cylinder, as illustrated. Thus, the cylinder can comprise the top part 9, described above, suitable for providing connection of the device to the pipeline of water to be treated, via the union.

The arrangement of the connection of the device to the pipeline in the top part further contributes to the evacuation of the gases formed by electrolysis from the cylinder into the pipeline, according to the ascending arrows in FIG. 1. Such an evacuation of the gaseous products of electrolysis is then direct from the device to the pipeline. The device and the system then advantageously do not need an intermediate tank for dilution of the gases in the water to be treated, in contrast to the prior art described above in the third category. Such a direct evacuation of the gases makes it possible to reduce the risks of explosion and of toxicity associated with the proposed storage of the reaction products. In the case of treatment of a swimming pool installation, the gases formed by electrolysis are directly evacuated in the pipeline under pressure for delivery of water, a pipeline on which the proposed device can be connected directly.

In addition to the advantages mentioned above, the proposed device and system make it possible to carry out water treatment using the products of electrolysis of salt but without having recourse to the use of ion exchange membranes. As mentioned above when describing the prior art in the first category, such membranes in particular have the disadvantage of only functioning well with softened water. The proposed device and system can advantageously do without a membrane and/or a water softener. Moreover, the proposed device is suitable for direct connection on the pipeline under pressure, in contrast to the membranes of the known devices, which do not support such a direct feed with the water to be treated under pressure.

With the proposed device, possible pressure drops in the water pipeline may occur depending on the installation the water of which is treated, for example in the case of cut-off of the water feed of the water pipeline under pressure. Thus, for a basin, for a water reserve, for a swimming pool or in industry, such as a cooling tower, it is possible that the engineering room is above the water level. Now, when the pump for circulating the water to be treated stops, the water pressure in the cylinder 16 and in the pipework 1 is no longer equal, since the pressure in the pipework decreases. In this configuration, the salt (hereinafter NaCl) can migrate into the main pipeline 6 and there is a risk of a gradual decrease of the reserve of salt in the cylinder 16. So that the user does not have to fill the cylinder 16 with salt regularly, a device can be provided that selectively prevents any exchange of water between the pipeline and the cylinder.

With reference to FIG. 1, the device 40 can comprise an electrovalve 8, at the outlet and before the union to the pipeline, said union being illustrated here by a pipe union 7. The system can then comprise a flow detector or a flow switch 2 associated with a control unit. This flow switch 2 detects whether or not there is a flow of water. The gases produced can then escape into the pipeline of water to be treated. If it detects a large flow of water, the information is sent to the control unit shown in FIG. 4 by the reference 80, which gives the authorization for the electrovalve 8 to open. If the sensor detects a low flow of water, the information is sent to the control unit, which gives the authorization for an electrovalve 8 to close. This information also allows the control unit to authorize or not authorize the production of sodium hypochlorite by cutting the voltage on the electrodes 14, to avoid accumulation of gases produced in the cylinder. Thus, it is preferable that each time the flow switch does not detect a flow of water, the control unit 80 stops the production of sodium hypochlorite or of hypochlorous acid and authorizes closure of the electrovalve 8.

According to an alternative embodiment that is not shown, the system can comprise an inverted ball valve. This valve is then arranged so as to aspirate air on stoppage of the circulation of water in the pipeline to purge the pipeline. In other words, the inverted ball valve is situated on the pipeline of water to be treated, for example downstream of the device positioned on the pipeline. Thus, when the circulation of water stops, the pipes fill with air and are emptied of their water. A proportion of the air can enter the cylinder and throughout the period during which the circulation of water is stopped, the salt cannot migrate from the cylinder to the pipeline. This embodiment is particularly useful when the device 40 is situated above the water level of a reservoir to be treated, to allow the delivery pipe to be emptied of its water. This can in particular be the case when using the device for treating the supply water of a swimming pool installation.

According to a preferred embodiment of the system, the system can comprise, upstream of the device 40, for example after the flow detector, a redox or amperometric reference electrode 3 installed in a measurement chamber, which allows the oxidizing power of the water to be determined. It is expressed in mV. Two types of electrodes can be selected: a redox electrode or an amperometric analysis electrode.

In fact, an ideal value for so-called quality water is between 450 and 700 mV. In the device proposed here, if the value analyzed by the redox or amperometric electrode 3 is below that determined and recorded beforehand as the reference threshold, i.e. 450 mV, it informs the control unit 80 for authorizing starting of the device 40. Conversely, if the value is higher, it will inform the control unit 80 for switching off operation of the device 40.

The system can also comprise, upstream of the device 40, for example after the flow detector 2 and/or after the redox or amperometric electrode 3, a pH reference electrode 4, installed in a measurement chamber, which allows the pH of the water to be determined. The pH is represented by a scale from 0 to 14, with 7 in the middle. Above 7 the pH is said to be basic. Below 7 the pH is said to be acid. The ideal pH for water is considered to be 7, or neutral.

This electrode 4 measures the pH of the water from a potential difference between the electrode and the water. Depending on the result and the threshold determined and recorded beforehand, it informs the control unit 80, which operates a pump which injects the necessary product to bring the pH of the water as close as possible to 7, or neutral. The water quality will then be perfect and the sterilizing action will be very effective. In fact, the more the pH is acid and the higher the concentration of hypochlorous acid, it is not desirable to maintain a pH at 6, as that is too corrosive for the installations. The ideal is therefore to maintain a pH between 6.8 and 7.10.

TABLE I

Bactericidal and germicidal efficacy of hypochlorous acid (HOCl) as a function of pH, in %

| pH | HOCl % | OCl⁻ % |
|---|---|---|
| 6 | 96.8 | 3.2 |
| 7 | 75.2 | 24.8 |
| 7.3 | 65.5 | 34.6 |
| 7.5 | 49.0 | 51.0 |
| 8 | 23.2 | 76.8 |
| 9 | 2.9 | 97.2 |

In a preferred embodiment, the control unit 80 can authorize stopping of production of sodium hypochlorite or of hypochlorous acid and closure of the electrovalve 8 based on several criteria.

First criterion: when the redox or amperometric electrode 3 has reached the given, pre-recorded value, the control unit 80 stops the production of sodium hypochlorite or hypochlorous acid by cutting the voltage on the electrodes of the electrolytic cells and by closing the electrovalve 7. This thus makes it possible to always have the same value of sodium hypochlorite or hypochlorous acid in the water to be treated. When this value is reached and the electrovalve is closed, there is no longer contact between the water to be treated and the water in the reserve, so that migration of NaCl can be avoided.

Second criterion: when the flow detector 2 detects a flow or non-flow of water in the pipeline 1, the control unit 80 stops, or does not stop, the manufacture of sodium hypochlorite or hypochlorous acid and closes or does not close the electrovalve 7.

Third criterion: for a basin, for a water reserve, for a swimming pool or in industry such as for a cooling tower, the control unit 80 authorizes opening or closing of the electrovalve when the circulating pump starts or stops. Thus, throughout the period when the system for circulation and filtration of a basin, of a water reserve, of a swimming pool or of a cooling tower in industry is stopped, the NaCl-laden water contained in the cylinder 16 is no longer in direct contact with the water to be treated 5 and the NaCl does not migrate.

EXAMPLE

The threshold of the value of potential reduction is set at 500 mV and if the value measured is also at 500 mV, the control unit 80 authorizes stopping of the manufacture of sodium hypochlorite or of hypochlorous acid and closure of the electrovalve 7. Thus, hypochlorite is no longer produced and the NaCl-saturated water is no longer in direct contact with the water to be treated 5 and the NaCl does not migrate.

Fourth criterion: Similarly, the control unit 80 authorizes stopping of the manufacture of sodium hypochlorite or hypochlorous acid and closure of the electrovalve 7 despite the fact that the measured analysis of the redox potential is below the threshold selected, for example: 420 mV is displayed if the flow detector no longer detects flow of water in the general water circuit 1. Under these conditions, once again, the NaCl-saturated water is no longer in contact with the water to be treated 5 and the NaCl does not migrate.

Figure 2:
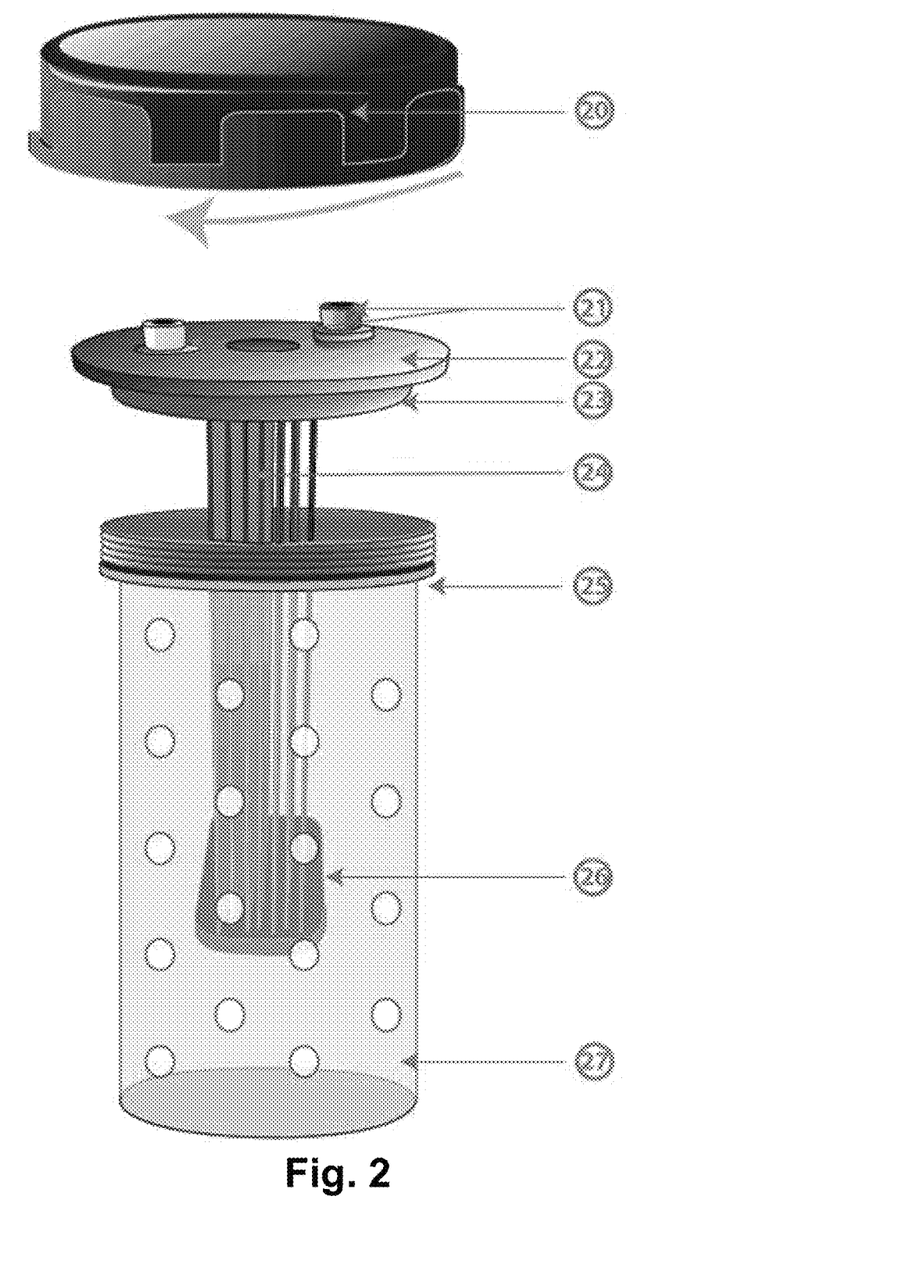
FIG. 2, a drawing of the electrolysis chamber 41.
Figure 3:
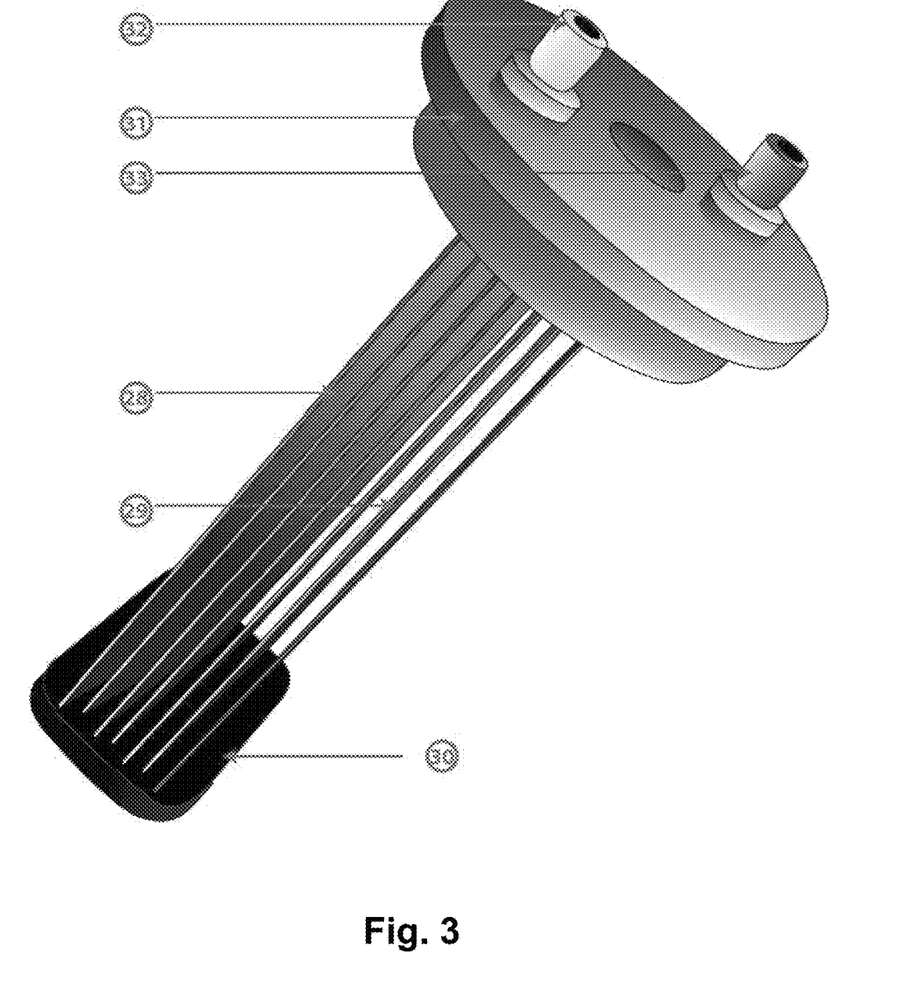
FIG. 3, a drawing of the electrolytic cell 42.

The embodiments of the electrolysis chambers are now described in more detail, with reference to FIG. 2. The electrolysis chambers 41 can be attached at the level of the holes in the flat portion 13 of the cylinder. These holes have for example a diameter of about 90 mm. An electrolytic cell with electrodes 24 can be screwed into each of these electrolysis chambers. Other methods of insertion of electrolytic cells into the chambers can be envisaged, such as insertion with a bayonet fitting. Being able to insert electrolytic cells with a variable number of electrodes 24 into the electrolysis chambers 41 of the cylinder 16 makes it possible to treat different flow rates of water and to produce large quantities of sodium hypochlorite or hypochlorous acid. These different quantities of production of sodium hypochlorite or hypochlorous acid were measured under the following conditions:

1/ The electrolytic cells are bipolar 42 and in accordance with FIG. 3 comprise seven plates 29, i.e. 7 electrodes with dimensions of 210 mm long by 55 mm wide. The bipolar electrolytic cells correspond to electrolytic cells with change of polarity. In other words, the electrodes 24 of the electrolytic cells become respectively negative and respectively positive during use.

2/ The salt charge was 35 kg and the analyses were carried out 36 hours after putting this charge in the water and after switching on the device (40).

3/ the analyses were carried out with different percentages of production. The results are as follows, according to the two tables:

TABLE II

Production of sodium hypochlorite or of hypochlorous acid with a single electrolytic cell

| Production % | Voltage (V) | Current intensity (A) | Production g/h |
|---|---|---|---|
| 10 | 2.448 | 1.5 | 3 |
| 50 | 2.98 | 4.5 | 10 |
| 100 | 3.48 | 7.9 | 15 |
| 150 | 4.01 | 11.08 | 21 |
| 200 | 4.51 | 15 | 29 |

TABLE III

Production of sodium hypochlorite or of hypochlorous acid with two electrolytic cells

| Production % | Voltage (V) | Current intensity (A) | Production g/h |
|---|---|---|---|
| 10 | 2.63 | 3.1 | 7.5 |
| 50 | 3.36 | 9.4 | 22.30 |
| 100 | 4.04 | 16 | 35.8 |
| 150 | 4.78 | 23.4 | 43 |
| 200 | 5.5 | 30.9 | 58.4 |

It can therefore be seen that the production of sodium hypochlorite or of hypochlorous acid is broadly sufficient for all of the applications that have been mentioned. Moreover, it is possible to increase this production further, in several ways:

1/ either by adding a bipolar electrolytic cell,

2/ or by increasing the number of plates or electrodes that the bipolar electrolytic cells contain, 3/ or by adding additional proposed devices in series.

These bipolar electrolytic cells 42 shown in FIG. 3 are composed of several plates 29 which constitute the bipolar electrodes 29, the number of which is not exhaustive. Preferably, in the proposed device all of these plates 29 that make up the bipolar electrolytic cells are in a number from two to twenty pieces depending on the configuration, depending on the flow rate of water to be treated and depending on the desired quantity of sodium hypochlorite or hypochlorous acid produced.

Between these different plates 29 that constitute the bipolar electrolytic cells 42, a given direct current of low continuous voltage circulates, which is reversed regularly, for example about every 90 minutes to 180 minutes; in fact, once the plates 29 that constitute the bipolar electrolytic cells 42 are positive and once the plates 29 that constitute the bipolar electrolytic cells 42 are negative and vice versa. The purpose of this change of polarity is to avoid fouling of them by the calcium ions present in the water.

In the various existing systems that have been described above, this reversal of polarity is not carried out. The user therefore has to clean the plates regularly, approximately weekly if he wants his system to operate properly. In this case it is no longer automatic. It is thus preferable for the electrolytic cells 29 (FIG. 3) to be bipolar, as described above, in order to eliminate all the disadvantages of the methods discussed above.

EXAMPLE if the bipolar electrolytic cell 42 is composed of seven plates 29 as in FIG. 3, four will be positive and three will be negative. After 90 minutes or 180 minutes of operation, the current is reversed and four will become negative and three will become positive. The time for reversal of polarity can vary from 90 to 180 minutes depending on the water hardness TH (being the Total Hardness corresponding to 10 mg of $CaCO_3$/l). In the device proposed here, it is preferably 90 minutes, but this time can be increased if the water hardness TH is below 25° TH (corresponding to below 250 mg of $CaCO_3$/l). In fact, in this configuration, as the water has a low calcium carbonate content, it is possible to increase this time for change of polarity. The working life of the bipolar electrolytic cells will be further increased.

This change of polarity therefore takes place regularly, throughout the operation of the device 40. Performing current reversal on the plates 29 that constitute the bipolar electrolytic cells 42 essentially allows cleaning of these plates 29. In fact, depending on the polarity and depending on the water hardness TH, deposits will be formed on these plates 29 constituting the bipolar electrolytic cells 42. If there is no reversal of polarity, after a certain operating time the deposits can become fixed to the plates 29 and can prevent exchange of current between the plates 29 constituting the bipolar electrolytic cells 42, and electrolysis of the salt water no longer takes place. By regularly reversing the polarity on the plates 29, the deposits will become detached. The plates 29 are thus always clean and the exchange of current is permanent, therefore there is regular production. There is also the advantage that the user does not have to service them.

Moreover, the change of polarity can be recorded by the control unit 80. This recording of the polarity by the control unit 80 is particularly useful. In fact, if the device 40 is stopped, while the time for change of polarity has not elapsed, this remaining time is recorded. When the device 40 restarts, the control unit 80 resumes the countdown.

EXAMPLE

Change of polarity is fixed at 90 minutes. The countdown takes place as follows:

The display of the control unit 80 indicates the position of the polarity: either on the right-hand plates 29 constituting the bipolar electrolytic cells 42 or on the left-hand plates 28 constituting the bipolar electrolytic cells 42. The change of polarity is recorded and displayed. The time on each polarity is 90 minutes. The display shows 90 60. The first two digits indicate the minutes 90 and the last two, the seconds 60, being 60 seconds. The seconds count down to zero. When the seconds are at zero, the countdown of the minute is switched on to pass to 89 and so on for 90 minutes. Example: 90 60 becomes 90 59 then 90 58 then 90 57 then 90 56 etc. and at 90 00 becomes 89 60 then 89 59 then 89 58 then 89 57 etc., down to 00 00.

If the device stops while the countdown is at 5847 on the display, when the device 40 restarts, the display of the control unit 80 will display 5847 again, and will count down to 5846, 5845, 5844 etc., to reach 5800 and pass to 5760 and so on down to 0000. Thus, the working life of each plate 28, 29 constituting the bipolar electrolytic cells 42 will have an equal working life.

The proposed device can have another useful advantage relating to the polarity change function. To improve the working life of the plates 29 constituting the bipolar electrolytic cells 42, the device 80 carries out depolarization of the plates 28, 29 constituting the bipolar electrolytic cells 42, during the change of polarity. If the current swings abruptly from one polarity to the other, the plates 28 and 29, being metallic, remain electrically charged for a certain length of time.

If the change of polarity swings abruptly from one polarity to another, mini-short-circuits are created on the plates 28, 29. These mini-short-circuits can gradually degrade the metal or graphite of which they are composed. To avoid this problem, an action called depolarization is proposed, preferably taking 5 minutes, which is controlled by the control unit 80.

EXAMPLE

If the voltage sent to the plates 29 constituting the bipolar electrolytic cells 42 is 3 volts and the current is 7 amperes, during depolarization the voltage is brought to 0 volt and the current to 0 ampere on the plates 29 in about 1.5 s. Then, for a specified period, preferably 5 minutes, the plates 29 will slowly discharge electrically in the water. When this period has elapsed, the change of polarity can take place, this time gradually supplying the plates 28. The voltage and current intensity will gradually rise to the values previously defined. Thus, the working life of the assembly of plates 28, 29 constituting the bipolar electrolytic cells 42 is increased considerably. The depolarization operation is now described from the standpoint of the control unit 80.

At the end of the countdown for change of polarity, the displays of the right and left polarities show 00 00, as well as the display of the production of chlorine of the control unit 80. The bipolar electrolytic cell slowly discharges electrically in the water. This is depolarization.

This operation makes it possible to avoid micro- or mini-short-circuits between the plates 28, 29. Their working life is thus prolonged. This step preferably takes five minutes and the displays show 00 00 and are incremented from 00 00 to 04 59. At the end of these five minutes, the next polarity indicator again displays 90 60 and the polarity countdown begins again. The change of polarity takes place automatically, and preferably every 90 minutes.

It is estimated that the working life of the plates 28, 29 is from 9000 to 10,000 hours of operation, with a maximum current density of 300 amperes per m². With a change of polarity every 90 minutes and with this principle of depolarization, under the same conditions a result exceeding 11,500 hours, or a gain of 15% was obtained. This is therefore a substantial advantage.

To permit a change of polarity on these plates 28, 29 and an improvement of efficiency, they preferably have a coating with particular characteristics. These plates 28, 29 constituting the electrolytic cells (42) are preferably of metal and especially titanium covered with a coating of metal oxides. The coating of metal oxides consists for example of 45 to 55% of titanium oxides, 25 to 30% of ruthenium oxide and 20 to 20% of iridium. To obtain such a configuration, several layers from 10 to 15µ can be deposited on the titanium-based substrate. The temperature of the assembly can then be raised (450°-1200°), using a kiln, to make it into a homogeneous substrate.

Even more preferably, the dimensions of the plates 28, 29 constituting the electrolytic cells 42 are from 50 to 210 mm long and from 15 to 65 mm wide. They are preferably separated by a regular space of 2 or 4 mm. The maximum dimension of the holes in the tubes forming the chambers is then preferably less than 4 mm or even 2 mm, for example less than one-tenth of a millimeter. Even more preferably, for further improvement of the working life of the electrodes and their efficiency, electrolysis is carried out in the cylinder 16 with a very low voltage on the plates 28, 29 that constitute the electrodes of the bipolar electrolytic cells 42, and a variable current (from 1 ampere to 18 amperes with a voltage from 0.20 V to 8 V).

EXAMPLE

The control unit 80 makes it possible to send a voltage and a variable current, depending on whether manufacture of sodium hypochlorite or hypochlorous acid is selected. This manufacture is expressed in the following table as production percentage. The charge of NaCl in the cylinder 16 is about 35 kg. The voltages and the currents sent between the plates 28, 29 constituting the bipolar electrolytic cells 42 are as follows:

TABLE IV

Voltages and currents sent between the plates

| | Electrode with 7 plates | |
|---|---|---|
| Production, % | Voltage (V) | Current (A) |
| 10 | 2.43 | 1.6 |
| 20 | 2.56 | 1.8 |
| 30 | 2.73 | 3.3 |
| (40) | 2.83 | 3.9 |
| 50 | 2.98 | 4.6 |
| 60 | 3.06 | 5.1 |
| 70 | 3.14 | 5.6 |
| 80 | 3.26 | 6.4 |
| 90 | 3.34 | 7 |
| 100 | 3.47 | 7.8 |
| 110 | 3.56 | 8.4 |
| 120 | 3.65 | 9 |
| 130 | 3.78 | 10 |
| 1(40) | 3.87 | 10.6 |
| 150 | 4.01 | 11.6 |
| 160 | 4.09 | 12.2 |
| 170 | 4.17 | 12.8 |
| 180 | 4.3 | 13.6 |
| 190 | 4.39 | 14.2 |
| 200 | 4.51 | 15 |

This ratio of voltage to intensity gives an even longer working life in hours of the plates 28, 29 that constitute the electrodes of the bipolar electrolytic cells 42, of the order of 15,400 hours of operation instead of the 11,500 noted above, i.e. a gain of 34%. In fact, in the above paragraphs it was stated that the average working life of the plates 29 constituting the bipolar electrolytic cells 42 is from 9000 to 10,000 hours of operation, and that this working life had been increased to 11,500 hours, thanks to the depolarization principle.

This working life is associated with the current sent to the plates 29 constituting the bipolar electrolytic cells 42, i.e. a maximum of 300 amperes per m² for optimum manufacture of sodium hypochlorite or of hypochlorous acid. According to an embodiment of the proposed device, average operation is 12 amperes. The surface area of the bipolar electrolytic cells 42 is 6 cm×20 cm=120 cm²×the number of plates (for example 7 plates) i.e. a total of 840 cm². To have a working life of 10,000 hours with a maximum current density of 300 amperes per m², the bipolar electrolytic cells 42 can therefore receive, as a function of this surface area of 840 cm², up to 25.2 amperes. Maximum operation can be 15 amperes, or a further improvement in gain of efficient working life.

Thus, for a preferred embodiment, the gain in terms of the working life of our bipolar electrolytic cells 42 passes 15,400 hours of operation instead of the 11,500 hours indicated previously. With the principle of depolarization and the controlled current densities on plates 28, 29 constituting the bipolar electrolytic cells 42, the gain is an additional 5400 hours. From the technical and commercial standpoint this is an obvious advantage, as our electrolytic cells 42 are the key element of the proposed device 40.

The device can further comprise a manometer 10 and a pressure controller 11, which are fixed on the top part 9 and make it possible to detect an excessive pressure in the cylinder. Depending on the information, the device 40 for manufacturing sodium hypochlorite or hypochlorous acid is or is not stopped by the control unit 80.

The manometer 10 is for example graduated from 0 to 12 bar. It makes it possible to verify good or poor operation of the device 40. In fact, if the pressure rises in the cylinder 16 this is synonymous with an abnormality. The pressure controller 11 is calibrated so that it reacts to this excessive pressure. When this pressure exceeds the defined value, the pressure controller 11, via the control unit 80, stops operation of the device 40. It can also trigger an audible alarm and/or stop the operation of the device 40. The pressure controller 11 allows redundancy of the flow switch 2, which is useful in the case of malfunction of the flow rate sensor 2.

The system can comprise a drain cock 18 in its bottom part. This allows draining of the whole device while filling the cylinder 16 with salt or during maintenance.

Figure 4:
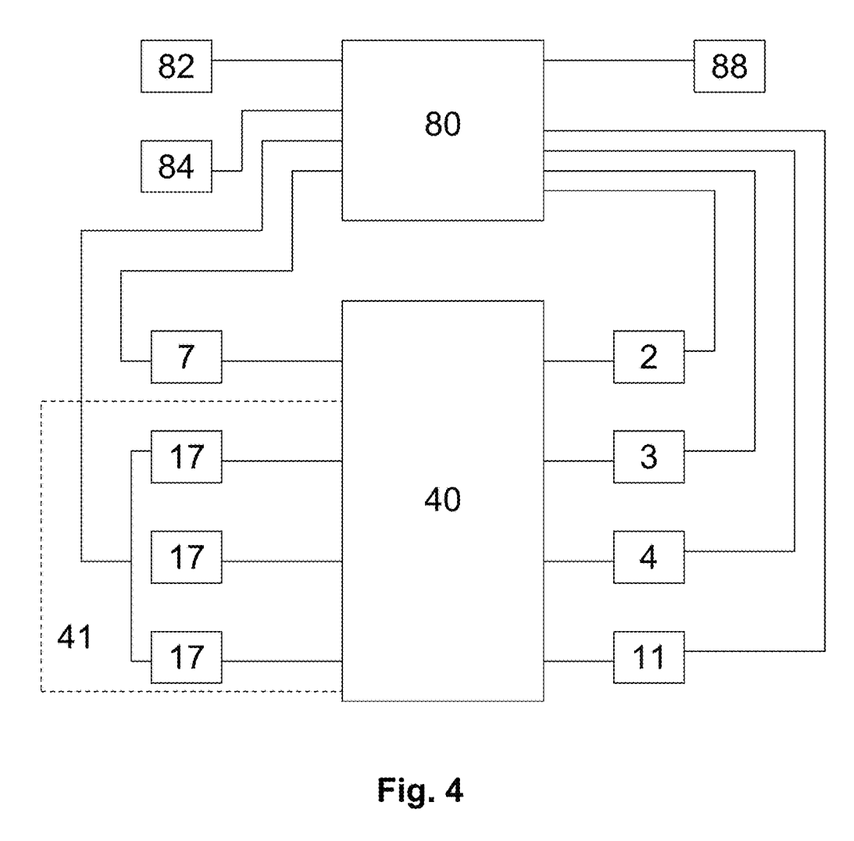
FIG. 4, a flowchart of operation of the system in forced operation and/or in automatic operation.

The whole device 40 is controlled by the control unit 80 of the system. On its front face, a liquid crystal screen 82, or Liquid Crystal Display (LCD), can be provided, communicating the information on operation of the device to the user. It gives information on measurement of the water temperature, on the pH level, on the degree of oxidation/reduction, on setting the various thresholds, on automatic operation or forced operation, on the operating time of the apparatus, on the percentage of manufacture of sodium hypochlorite or hypochlorous acid selected, as well as on the various diagnostics. Thus, the user knows exactly whether the device is operating correctly or not.

All the elements or units of the device 40 the monitoring of which may be important, and which are shown in FIG. 1, are under control, such as: the flow switch 2, operation of the analysis electrodes 4 and 3, operation of the electrovalve 8 and operation of the bipolar electrolytic cells 17 for manufacturing sodium hypochlorite or hypochlorous acid. Several diagnostics for each item can thus be determined.

Regarding the mechanical part: the flow switch 2, the electrovalve 7, and the pressure controller 11, various malfunctions can be determined using supply current and/or voltage sensors of each of these components. It is then possible to determine the following malfunctions:

DCB 01: no supply, no measurements of current for the flow switch 2 in the case where the supply current of the flow switch 2 is not measured by the sensors of the control unit 80 while it is within its operating range;

DEL 02: no supply, no measurements of current for the electrovalve 7 in the case where the supply current of the electrovalve 7 is not measured by the sensors of the control unit 80 while it is within its operating range;

DCP 03: the value of the pressure sensor or of the pressure controller 11 is abnormal. The measured pressure is above the threshold of the calibrated value recorded previously in the memory of the control unit 80.

Regarding the analysis part, different malfunctions can be determined:

DRX 04: The calibration of the redox or amperometric electrode 3 can no longer be calibrated.
The redox or amperometric electrode 3 is perhaps not connected to the control unit 80 or it is defective or too old.

DRX 05: The Redox display fluctuates permanently. The redox or amperometric electrode 3 is defective or air is present in the water circuit 1.

DRX 06: The value displayed stays blocked for more than twenty minutes at the extreme values (000 and 900 mV) where they exceed the limits of the recorded values. The redox or amperometric electrode 3 is defective or is not connected to the control unit 80 or the connections on the IC or to the BNC plug are badly soldered in the control unit 80.

DRX 07: The values analyzed exceed the limits of the recorded values. The redox or amperometric electrode 3 is defective or incorrect information is recorded in the memory of the control unit 80. The displayed values are abnormal and do not correspond to the base values recorded in the memory of the control unit 80. Problems of overvoltage or of micro-short-circuits.

DRX 08: Stored threshold values are impossible. Problems with connections in the control unit 80 or problems of overvoltage or of micro-short-circuits.

DPH 09: The calibration of the pH electrode 4 is impossible:
The pH electrode 4 can no longer be calibrated as it is too old, the pH electrode 4 is perhaps not connected to the control unit 80 or it is defective.

DPH 10: The pH displayed fluctuates permanently. The pH electrode 4 is defective or air is present in the water circuit 1.

DPH 11: The value displayed stays blocked for more than twenty minutes at the extreme values (0.57 and 10.75). The pH electrode 4 is defective or is not connected or the connections on the IC or to the BNC plug are badly soldered in the control unit 80.

DPH 12: The values analyzed exceed the limits of the values recorded. The pH electrode 4 is defective or incorrect information is recorded in the memory of the control unit 80. The displayed values are abnormal and do not correspond to the base values (which may be connected with problems of overvoltage or of micro-short-circuits).

DPH 13: Threshold values stored are impossible. Problems with connections in the control unit 80 or problems of overvoltage or of micro-short-circuits.

Regarding the part for production of sodium hypochlorite or hypochlorous acid, various malfunctions can be determined:

DPE 14: The connection of the bipolar electrolytic cells 42 is not good or the bipolar electrolytic cells 42 are disconnected, badly connected or oxidized. The bipolar electrolytic cells 42 have exceeded their defined working life.

DPE 15: After 15,000 hours of operation of the device, this diagnostic appears. It indicates that the bipolar electrolytic cells 42 should be checked or changed.

All this information and all the triggering of associated diagnostics can be recorded and stored for 30 days in a loop. With reference to FIG. 4, when one of the elements or components fails, the information can be displayed for the user on the LCD screen 82. Different LEDs can be provided near the LCD screen 82, to indicate operation or malfunction of the various components of the system. It is possible to provide cancelling of the display of diagnostics by appropriate intervention on the buttons situated on the front of the system 84 and provided that the problem displayed has been resolved.

The control unit 80 can comprise a system 88 for remote transmission of information. Information can be sent to the maintenance department by carrier currents via the electrical system supplying the system 88 for remote transmission of information or by a modem integrated in the system 88 for remote transmission of information and via the telephone system. The system 88 for remote transmission of information can be interrogated remotely to verify its proper operation simply via an electrical socket. Any type of information can thus be collected in a centralized manner, such as the production percentage, electricity consumption, number of hours of operation, as well as diagnostic messages, or operation of the different systems of the device for an abnormal period of time. The information can be transmitted to a centralized data storage on a server or to a remote troubleshooter. The information stored remotely can then be used for providing troubleshooting services. The user can thus be warned by telephone that intervention is required on the device 40, and/or he can be given the address of a device specialist.

The system 88 for remote transmission of information can thus comprise emitting and collecting carrier current sockets. The system 88 for remote transmission of information can also comprise a GPRS (General Packet Radio Service) system, collector and emitter of information. It is also possible to envisage using a WIFI (Wireless Fidelity) connection for transmitting the information. Alternatively, the information can be recovered manually from the system 88 for remote transmission of information using a Universal Serial Bus (USB) port, for connecting to a computer or to a removable data storage medium.

At the level of the system 88 for remote transmission of information, the information can be collected by the control unit 80 by a "data collector" card, interrogating the different units of the device 40, for example every 10 seconds. The "data collector" card is a data collecting component. The information or data, received correctly, are immediately communicated to the system 88 for remote transmission of information.

According to an embodiment, the system for remote transmission of information 88 can be external, to be placed as close as possible to a telephone socket at the premises of the user of device 80. System 88 for remote transmission of information becomes a system for receiving information from the "data collector" card integrated in the control unit 80. In such an embodiment, communication of the data collected between the control unit 80 and the receiving system 88 can be effected by carrier current on the user's domestic system (for example 220V system). The data frames are stored, with the date and time of reception by the receiving system 88. The receiving system 88 can be composed of an LCD touch screen and means for integration of a modem.

The receiving system can be connected via its integrated modem to the telephone line of the user of the device 40, thus allowing transmission of the history of operation, i.e. the data collected by the "data collector" card and received by the receiving system 88, to a remote troubleshooter or to the manufacturer of the system. This transmission of the history of operation can be carried out automatically during a malfunction for a long time, for example three days. Preferably, transmission of the information can take place in the case of malfunction. Thus, during a malfunction, the remote troubleshooter recovers all the data stored by the receiving system 88. Software can be provided for processing the data thus received, permitting for example archiving of the data, printing thereof or preparation of a chart.

According to a preferred embodiment, the receiving system 88 communicates with the control unit 80 of the device 40 to adapt control to the malfunction detected. Adaptation of the control of the device can for example comprise modification of the production percentage, forced operation or automatic operation, modification of the desired threshold. According to such an embodiment, during a malfunction, the receiving system 88 sends the data that it has stored to the remote troubleshooter and in return receives an appointment (date and time), at which the receiving system 88 must again call the remote troubleshooter to recover orders for adaptation of the control of the device (40) to control the problem.

After detection of a malfunction and if no useful modification can be carried out by the troubleshooter remotely, a direct intervention on the device 40 may be envisaged. The user can thus be warned by telephone that intervention is required on the device 40, and/or can be given the address of a specialist in the device 40.

The "data collector" card, the system 88 for transmission of information, the receiving system 88 and the remote troubleshooter software can form a unit for remote processing of the information of the device 40. This unit for remote processing of information makes it possible to reduce the intervention time for carrying out an after-sales intervention or to know, before sending a field technician, what type of fault has to be resolved. This in particular allows savings of maintenance costs by ensuring that the technicians depart for the intervention site with the defective part and the possibility of being prepared for the type of fault detected. The unit for remote processing of the data of the device 40 also advantageously makes it possible to avoid sending out a technician when the device 40 is not faulty but the user is not using it correctly. In fact, such cases of needless trips can represent up to 60% of a technician's intervention trips. The proposed unit further allows determination in advance of possible future faults. Thus, it is possible to anticipate possible faults and intervene even though the user does not yet know that occurrence of a problem with the device 40 is imminent. The proposed unit further allows improvement of the speed of intervention, which is particularly useful for resolving problems on key components of the device 40.

FIG. 4 shows one possibility for wiring of the device 40 with the control unit 80. The control unit 80 is thus connected to various elements or units of the device 40, allowing the information to be centralized for the user, on the LCD screen 82, or for a maintenance centre via the data transmission device, allowing operation of the device 40 under remote monitoring.

The device 40 can comprise forced operation and automatic operation. With reference to FIG. 4, the control unit 80 can comprise a user interface 84, having for example buttons, for selecting forced operation or automatic operation, for setting the thresholds, for setting the production percentage, and for carrying out calibration of the redox or amperometric electrode and the pH electrode. The user interface 84 can also make it possible to control the electrovalve 7 and/or the production of sodium hypochlorite or hypochlorous acid, for example via the control unit 80.

The user interface 84 can also allow control based on analysis of the redox or amperometric potential 3 and/or production of sodium hypochlorite or hypochlorous acid, for example via the control unit 80. The user interface 84 can further allow the user to obtain information sequentially on the operational status of the device 40, on the production of sodium hypochlorite or hypochlorous acid, the pH value analyzed, the redox value analyzed, or on the operating times of the device 40 recorded by the control unit 80 over time.

During forced operation, the control unit 80 only controls stopping of the device 40 when the measured redox value 86 is reached. The forced operation position will be very useful in the case of basins, water reserves or swimming pools. During automatic operation, the control unit 80 optimizes the production of sodium hypochlorite or hypochlorous acid.

The control unit 80 can control stopping of the device 40 by cutting the supply of low-voltage direct current to the bipolar electrolytic cells 42, in the case where the flow detector 2 no longer detects flow of water. The control unit 80 can control stopping of the device 40 by cutting the supply of low-voltage direct current to the bipolar electrolytic cells 42, and by closing the electrovalve in the case where the control unit 80 is under the control of an external element, for example a control box of a pump in a water circuit of swimming pools, basins, water reserves or cooling towers. The control unit 80 can control stopping of the device 40 by cutting the supply of low-voltage direct current to the bipolar electrolytic cells 42, in the case where the result of analysis of the redox or amperometric potential 86 exceeds the value of the pre-recorded threshold.

The control unit 80 can control opening of the electrovalve 7 in the case where the pressure sensor has detected an abnormal pressure in the cylinder 16 of the device 40. The control unit 80 can control stopping of the device 40 by cutting the supply of low-voltage direct current to the bipolar electrolytic cells 42, in the case where the pressure sensor has detected an abnormal pressure in the cylinder of the device 40.

The control unit 80 can control the operation of the device 40 for a minimum duration. Thus, if just after the start of operation of the device 40 for production, the conditions are no longer favourable, the control unit 80 controls operation for a duration of, for example, three minutes. This makes it possible to avoid a succession of starts and stops of the device 40 that are too close together in time. Similarly, when stopping of the device 40 has been controlled by the control unit 80, the order for stopping can be maintained for a minimum time, for example three minutes.

EXAMPLE

If the device 40 is in automatic mode and if the redox value analyzed is too close to the set value such as 500 mV and if the analysis varies between 501 and 499 and 502 and 499 etc., the control unit waits for a minimum of three minutes for the analysis to stabilize in order to issue a new order.

The device 40 can comprise the system for remote transmission of information 88. The device 40 can also comprise a system for storing all the data from the device 40 such as:
the production percentage,
the analyzed value of the water pH,
the analyzed value of the redox potential of the water,
the pressure value of the pressure controller,
the threshold values selected,
the operating time of the apparatus, for determining the changing of the bipolar electrolytic cell or cells,
the change of polarity on the bipolar electrolytic cell or cells,
the occurrence of each power cut,
automatic operation or forced operation,
the triggering of diagnostics; 15 diagnostic values are, for example, possible.

This information can be recorded at least three times per day for 30 days in a loop. However, it may be preferable to store the information on the occurrence of power cuts or the triggering of diagnostics.

The invention claimed is:

1. A device for producing sodium hypochlorite or hypochlorous acid by electrolysis of NaCl salt-saturated water, the device being suitable for being connected directly on a pipeline of water to be treated under pressure of a water treatment system, the device comprising:
   a cylinder storing salt in solid form, the cylinder being suitable for being supplied directly by the pipeline of water to be treated under pressure to form the NaCl salt-saturated water, the cylinder comprising more than one tube;
   wherein each of the tubes forms an electrolysis chamber adapted for generating sodium hypochlorite or hypochlorous acid by electrolysis of the NaCl salt-saturated water;
   wherein an electrolytic cell provided with electrodes is inserted into each of the electrolysis chambers; and
   wherein each of the tubes is perforated so as to enable the corresponding electrolytic cell to be in contact with the NaCl salt-saturated water to be electrolyzed, and to prevent NaCl salt in solid from coming into contact with the electrodes of the electrolytic cell.

2. The device for producing the sodium hypochlorite or hypochlorous acid according to claim 1, wherein that the salt is not in the water to be treated.

3. The device for producing the sodium hypochlorite or hypochlorous acid according to claim 1, wherein the electrodes of each electrolytic cell are in the form of plates between which a circulating current of low continuous voltage reverses direction regularly, at a fixed time period, during usage of the device.

4. The device according to claim 3 wherein the electrodes in the form of the plates are made of titanium covered with metal oxides.

5. The device for producing the sodium hypochlorite or hypochlorous acid according to claim 3, wherein the fixed time period during which the circulating current of low continuous voltage reverses direction, is from 90 minutes to 180 minutes.

6. The device for producing the sodium hypochlorite or hypochlorous acid according to claim 5, further comprising a manometer adapted to measure the pressure present in the cylinder, and a pressure controller adapted to detect an excessive pressure in the cylinder, wherein the manometer and the pressure controller are mounted on the removable top part of the cylinder.

7. The device for producing the sodium hypochlorite or hypochlorous acid according to claim 1, wherein:
   a removable top part is fixed, by screwing, to an upper part of the cylinder;
   the removable top part has an outlet equipped with a PVC pressure hose;
   the outlet in the removable top part and the PVC pressure tube have a diameter of about 50 mm; and
   a free end of the PVC pressure tube is adapted to receive a pipe union for detachably connecting the device to the pipeline of the water to be treated.

8. A water treatment system comprising;
   (a) a device adapted to produce sodium hypochlorite or hypochlorous acid by electrolysis of NaCl salt-saturated water;
   (b) a pipeline of water to be treated under pressure;
   (c) the device being connected to the pipeline of water to be treated under pressure at a junction point positioned on the pipeline of the water to be treated under pressure; and (d) a control unit operably controlling the operation of the device adapted to produce the sodium hypochlorite or hypochlorous acid;

the device comprising:

a cylinder storing NaCl salt in solid form, the cylinder being supplied directly by the pipeline of the water to be treated under pressure, the cylinder comprising more than one tube;

wherein each of the tubes forms an electrolysis chamber adapted to generate the sodium hypochlorite or hypochlorous acid by electrolysis of the NaCl salt-saturated water;

wherein an electrolytic cell provided with electrodes is inserted into each of the electrolysis chambers; and wherein each of the tubes is perforated so as to enable the corresponding electrolytic cells to be in contact with the NaCl salt-saturated water to be electrolyzed, and to prevent the NaCl salt in solid from coming into contact with the electrodes of the electrolytic cells.

9. The treatment system according to claim 8, further comprising a flow detector positioned on the pipeline, upstream of the junction point operably detecting whether or not there is a flow of the water in the pipeline for starting or not starting the device by the control unit.

10. The treatment system according to claim 9, further comprising in the pipeline:

after the flow detector and upstream of the junction point and of the device, a redox or amperometric electrode adapted to analyze oxidizing power of the water to regulate the oxidizing power of the water by allowing or not allowing the production of the sodium hypochlorite or of hypochlorous acid; and after the redox or amperometric electrode, a pH electrode, which makes it possible to analyse and regulate a pH of a water to be treated.

11. The treatment system according to claim 8, further comprising:

a pressure controller positioned on the cylinder of the device in its top part for detecting an excessive pressure, at which the control unit controls stopping of the production of the sodium hypochlorite or hypochlorous acid; and a drain cock at a bottom, to allow maintenance of the device.

12. The treatment system according to claim 8, wherein the pipeline comprises, downstream of the junction point with the device, an inverted ball valve suitable to stop circulation of the water in the pipeline, to aspirate air and to purge the pipeline.

13. A unit for remote processing of data from the device for producing the sodium hypochlorite or hypochlorous acid, the unit comprising:

the system according to claim 8 and a system for remote data transmission to a centralized data storage on a server or to a remote troubleshooter comprising a remote communication device selected from the group comprising a carrier current connector transmitter/receiver, GPRS transmitter/receiver, WIFI transmitter/receiver.

14. A unit for remote processing of data from the device for producing the sodium hypochlorite or hypochlorous acid, the unit comprising:

the system according to claim 8 whose control unit comprises a unit adapted to collect data on a state of operation and malfunction of the device;

a system adapted to remotely transmit data being external to the control unit and designed to communicate by carrier current with the data collecting unit, the remote data transmission unit comprising a modem adapted to remotely send the data collected by the data collecting unit and received by the control unit; and software, stored in non-transient computer memory, operably processing the data transmitted by the remote data transmission system by the modem.

15. The water treatment system according to claim 8, wherein the pipeline of the water to be treated is a delivery pipe of a swimming pool installation.

* * * * *